(12) United States Patent
Garza et al.

(10) Patent No.: US 9,350,797 B2
(45) Date of Patent: May 24, 2016

(54) REQUEST-RESPONSE OPERATION FOR ASYNCHRONOUS MESSAGING

(71) Applicant: International Business Machines Corporation, Armonk, NY (US)

(72) Inventors: Jose E. Garza, Richmond (GB); Stephen J. Hobson, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 333 days.

(21) Appl. No.: 14/053,230

(22) Filed: Oct. 14, 2013

(65) Prior Publication Data
US 2014/0108492 A1   Apr. 17, 2014

(30) Foreign Application Priority Data
Oct. 15, 2012 (GB) .................................. 1218445.3

(51) Int. Cl.
*G06F 15/16* (2006.01)
*H04L 29/08* (2006.01)
*G06F 9/46* (2006.01)
*G06F 9/54* (2006.01)

(52) U.S. Cl.
CPC ............. *H04L 67/10* (2013.01); *G06F 9/466* (2013.01); *G06F 9/546* (2013.01)

(58) Field of Classification Search
USPC .................. 709/202, 223, 245, 248
See application file for complete search history.

(56) References Cited

U.S. PATENT DOCUMENTS

| 6,219,711 | B1 * | 4/2001 | Chari ........................... 709/232 |
| 7,191,253 | B1 * | 3/2007 | Clark et al. ................... 709/250 |
| 8,103,713 | B2 * | 1/2012 | Khodabakchian et al. ... 709/201 |
| 2003/0018808 | A1 * | 1/2003 | Brouk et al. .................. 709/238 |

(Continued)

FOREIGN PATENT DOCUMENTS

WO   2006122587 A1   11/2006

OTHER PUBLICATIONS

Pamela Fong, "Asynchronous processing in WebSphere Process Server," DeveloperWorks, http://www.ibm.com/developerworks/websphere/library/techarticles/090 . . . , Apr. 29, 2009, 17 pages.

(Continued)

*Primary Examiner* — Liangche A Wang
(74) *Attorney, Agent, or Firm* — Cantor Colburn LLP; Rahan Uddin

(57) ABSTRACT

Disclosed are methods, systems, and computer programs for facilitating communication between a client application and a server application. A client application initiates an asynchronous communication with the server application by sending a request via a communication manager. The communication manager sends the request synchronously to the server application. Responsive to the communication manager not having received a final response from the server application, the communication manager responds to the client application that the sending the request was unsuccessful. Responsive to the communication manager having received a final response from the server application, the communication manager retains the response from the server application and responds to the client application that the sending a request was successful. The client application requests a final response from the communication manager and the communication manager provides the previously retained response.

15 Claims, 8 Drawing Sheets

(56) References Cited

U.S. PATENT DOCUMENTS

| | | |
|---|---|---|
| 2005/0234928 A1* | 10/2005 | Shkvarchuk et al. ......... 707/100 |
| 2007/0162560 A1* | 7/2007 | Jin ............................... 709/217 |
| 2010/0095308 A1 | 4/2010 | Blue et al. |
| 2010/0169469 A1* | 7/2010 | Malladi et al. ................ 709/223 |
| 2012/0303720 A1 | 11/2012 | Rajasekar et al. |
| 2013/0054674 A1* | 2/2013 | Myers et al. ................. 709/203 |

OTHER PUBLICATIONS

IBM, "A Method for Synchronous Request Response Message Processing," IBM.com No. IPCOM000032443D, Nov. 5, 2004, 4 pages.

JMS (Java Message Service) Part VI Integration, http://static.prongsource.org/docs/3.0.5.RELEASE/reference/jms.html, Apr. 26, 2012, 15 pages.

UK Search Report Under Section 17(5), Application No. GB1218445.3; Date of Mailing: Mar. 4, 2013, 3 pages.

* cited by examiner

REQUEST-RESPONSE OPERATION FOR ASYNCHRONOUS MESSAGING

PRIORITY

This application claims priority to Great Britain Patent Application No. 1218445.3, filed 15 Oct. 2012, and all the benefits accruing therefrom under 35 U.S.C. §119, the contents of which in its entirety are herein incorporated by reference.

BACKGROUND

There are several problems with optimal use of asynchronous messaging solutions (Java Message Service (JMS) providers, native IBM WebSphere MQ (WMQ), and similar) to access applications through the request-response pattern. (Java and all Java-based trademarks and logos are trademarks or registered trademarks of Oracle and/or its affiliates; IBM and WebSphere are trademarks of International Business Machines Corporation, registered in many jurisdictions worldwide.)

In spite of these problems, the asynchronous messaging model embodied in APIs such as the MQI and JMS remains popular and it would be highly desirable to provide an implementation where this style of coding actually works. There are a variety of reasons for this, including: the asynchronous model (put/send a message, get/receive a message) is particularly simple and intuitive; in an application, or suite of applications, that already uses asynchronous messaging, it can be beneficial to use the same APIs, programming skills, and so on for request-response; and if an installation is already using a messaging provider such as Websphere MQ, then using the same provider for request-response allows uniform management (resource allocation, security management, and so on).

SUMMARY

Embodiments disclosed herein include a method for facilitating communication between a client application and a server application. One such method includes the client application initiating an asynchronous communication with the server application by sending a request via a communication manager. The method also includes the communication manager sending said request synchronously to the server application. The method also includes, in response to the communication manager not having received a final response from the server application, the communication manager responding to the client application that said sending the request was unsuccessful. The method also includes, in response to the communication manager having received a final response from the server application, the communication manager retaining the response from the server application and responding to the client application that the sending a request was successful The method also includes the client application requesting a final response from the communication manager and the communication manager providing the previously retained response.

Embodiments disclosed herein include an apparatus for facilitating communication between a client application and a server application. One such apparatus includes a communication manager, with which the client application initiates an asynchronous communication with the server application by sending a request via a communication manager. The communication manager sends the request synchronously to the server application. Responsive to the communication manager not having received a final response from the server application, the communication manager responds to the client application that said sending the request was unsuccessful. Responsive to the communication manager having received a final response from the server application, the communication manager retains the response from the server application and responds to the client application that the sending a request was successful. The communication manager responds to the client application requesting a final response from the communication manager by providing the previously retained response.

Embodiments disclosed herein include a computer program product for facilitating communication between a client application and a server application. One such computer program product includes a computer readable storage medium having computer readable program code embodied therewith. The computer readable program code is adapted to perform one of the methods described herein when said program is run on a computer.

BRIEF DESCRIPTION OF SEVERAL VIEWS OF THE DRAWINGS

Embodiments will now be described in more detail, by way of example only, with reference to the accompanying drawings, in which.

DETAILED DESCRIPTION

Embodiments disclosed herein relate to the field of asynchronous messaging solutions which access server applications through a request-response pattern, and more particularly to the handling of slow responses from server applications during such accesses.

Figure 1:
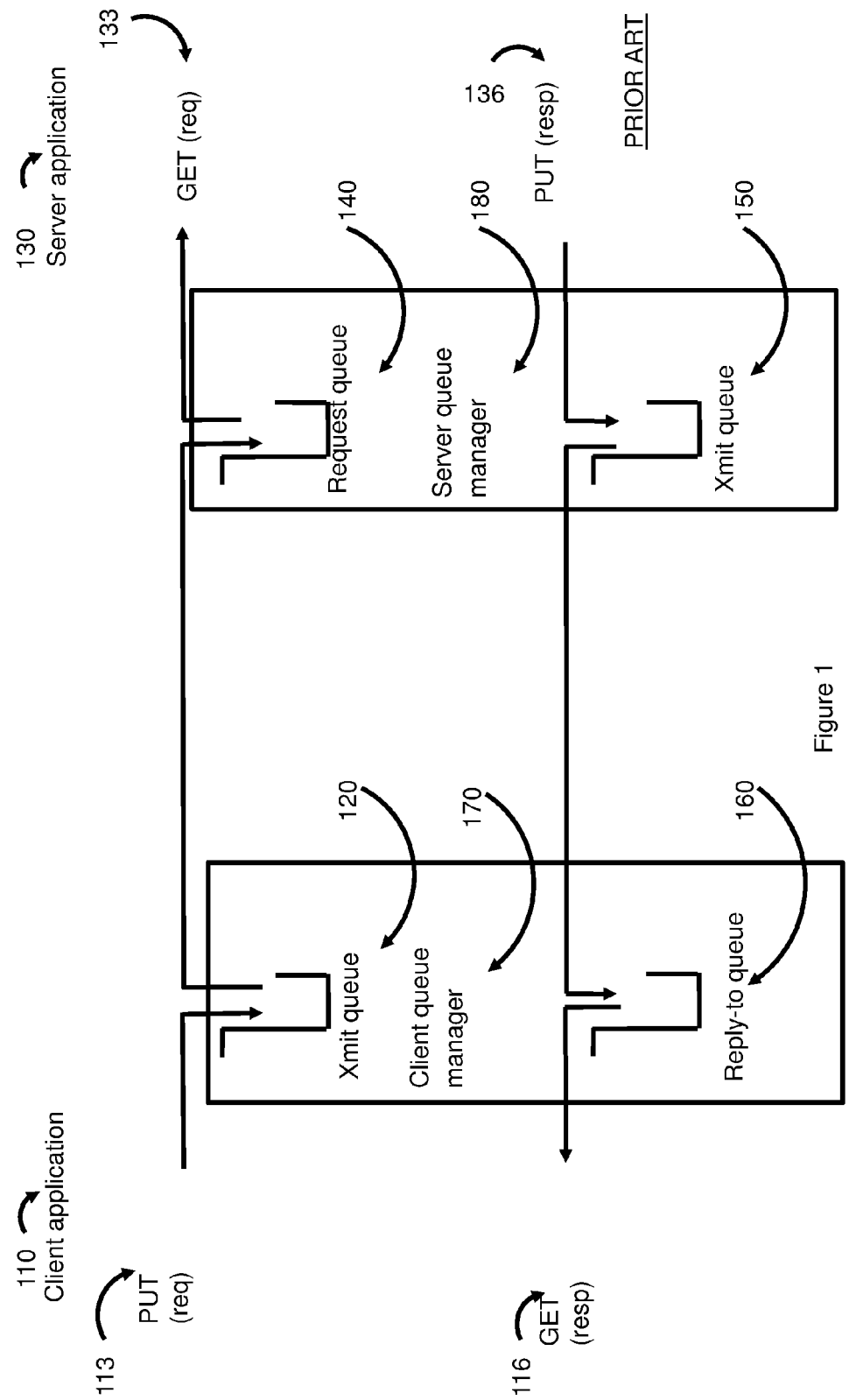
FIG. 1 shows an example of a slow response problem.

Some contemporary asynchronous messaging solutions (Java Message Service (JMS) providers, native IBM WebSphere MQ (WMQ), and similar) access applications through the request-response pattern. This request-response pattern can lead to slow response times, as will now be discussed with reference to FIG. 1. In FIG. 1, client application 110 prepares a message (the request) and issues a PUT verb 113 (MQPUT, JMS send, or the like) to send the message to request queue 140.

In accordance with asynchronous messaging practices client queue manager 170 first places the message on its transmit (xmit) queue 120. The client queue manager 170 then transmits the message from its xmit queue 120 to the request queue 140, which is hosted on server queue manager 180. Server application 130 issues a GET verb 133 (MQGET, JMS receive, or the like) to retrieve the message from the request queue 140, processes the message (that is performs the requested service) and issues a PUT verb 136 to send a response message back to the reply-to queue 160 which was specified in the request message. To do this, the server queue manager 180 first places the response message onto its xmit queue 150 and then transmits the message to the reply-to queue 160. The client application 110 issues a GET verb 116 to get the response message from the reply-to queue 160.

In most cases, client application 110 cannot wait forever for the response message and so uses a receiving GET verb 116 that times out. Client application 110 has a problem if the receiving GET verb 116 does time out because in that case client application 110 does not know whether server application 130 performed the requested action or not. All that client application 110 knows is that the receiving GET verb 116 timed out. It cannot differentiate between the situation where the server application 130 completed the request, but the communication of the response message back to the client application 110 failed and the situation where the server application 130 failed to complete the request and the communication of that failure back to the client application 110 failed.

Reliable messaging further complicates the situation since it allows the PUT verb 113 sending the request message to complete even if the server application 130 cannot be contacted because of communication problems or because it is not running. Either the request message will be delivered eventually to server application 130, or it will expire (if an expiry time is specified for the PUT verb 113) or, in the worst case, the request message will remain indefinitely in the messaging system (for example, in the client queue manager's 170 xmit queue 120).

Similarly, when server application 130 receives the request message it may successfully issue its sending PUT verb 136 for the response message even if the client application 110 is no longer contactable. In a similar manner to the request message, either the response message will be delivered eventually to client application 110, or it will expire (if an expiry time is specified for the PUT verb 136) or, in the worst case, the response message will remain indefinitely in the messaging system (for example, in the server queue manager's 180 xmit queue 150).

Setting expiry times for request and response messages can alleviate the consequences of the problem somewhat, at least by preventing messages from remaining on queues indefinitely, but many messaging systems don't guarantee to expire messages in a timely fashion. In any case, client application 110 has a problem if the response message fails to arrive quickly enough (whether or not it expires).

A contemporary technique to alleviate the consequences of the problem involves the following sequence. Responsive to a client application initiating a synchronous communication with a server application by sending a request via an asynchronous communication manager, one or more checks are performed to identify a cause of any failure to provide a response to the client application satisfying synchronous communication criteria. The results of one or more checks are used to determine whether to back out any data updates performed by/on behalf of the server application in response to that request.

Figure 2:
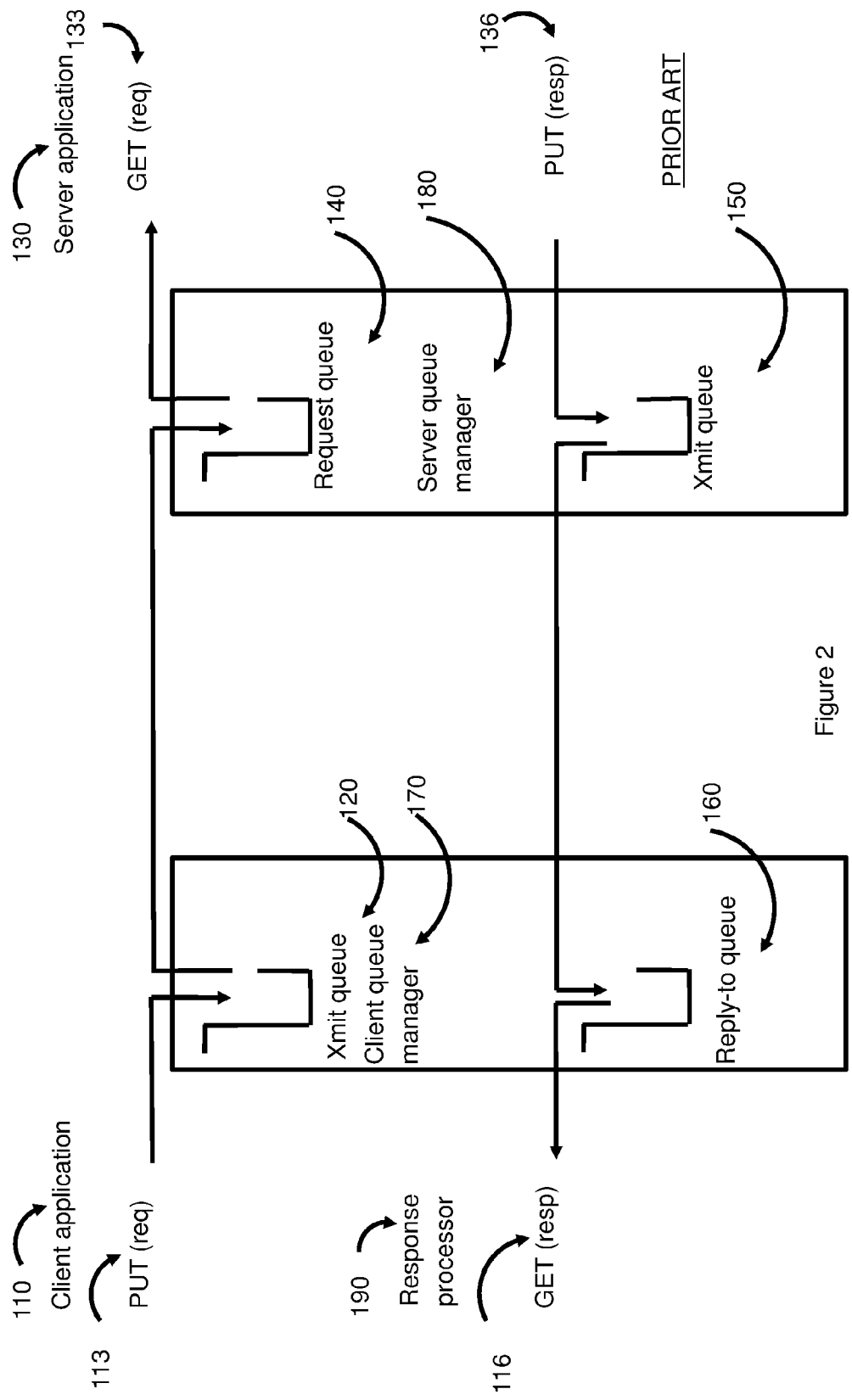
FIG. 2 shows another example of a slow response problem.

As another example of how the request-response pattern can lead to slow response times, reference is made to FIG. 2, where client application 110 invokes server application 130 by preparing a message (the request) and issuing a PUT verb 113 (MQPUT, JMS send, or the like) to result in the sending of the message to request queue 140. Client application 110 does not itself receive the returned response message. Instead, response processor 190 is configured so that the response message "wakes up" response processor 190 which then processes the response message by issuing a GET verb 116 to get the response message from the reply-to queue 160. In a Java Enterprise Edition environment, response processor 190 is typically a message-driven bean. The response processor 190 may be a thread started whenever a message appears on the reply-to queue 160. The response processor 190 may be other code that is configured to do a "GET-WAIT" on the reply-to queue 160. Typically, the client application 110 exits after sending the request, having left information accessible to the response processor 190 as to how the response should be handled, such as what the request was, why it was sent and what is supposed to happen next. As it is likely that more than one request will have been sent, the client application 110 may include a correlation ID in the request message, which the server application 130 returns in the response message.

This second example of FIG. 2 is generally considered superior to the first example of FIG. 1. The embodiment can be configured in a way that ensures neither the request message nor the response message (if any) goes missing or remains indefinitely. However the embodiment is not suitable for applications where the requestor (client application 110 or a user of client application 110) needs to know the outcome of the request to server application 130 within a "reasonable" time.

Contemporary asynchronous messaging solutions may also experience the transaction problem, as will now be discussed with reference to FIG. 3, where the functions desired to be achieved by a naive programmer are shown. Client application 110 wishes to invoke server application 130 by sending a request message and receiving the response message. Client application 110 wants to treat the function provided by server application 130 as part of a single transaction that includes other actions requested by client application 110. For example, client application 110 may perform some database updates as well as invoking server application 130. These, or other, updates may be carried out at any, or all, of blocks 320, 330 or 340 in FIG. 3.

An intuitive way to achieve this is to code something like:

---

BEGIN TRANSACTION (block 310)
other processing (block 320) --
MQPUT /* send request message to server application 130 */
other processing (block 330) --
MQGET /* receive response from server application 130 */
other processing (block 340) --
COMMIT TRANSACTION (block 350)
This style of coding is one of the commonest "beginners' mistakes" in asynchronous messaging.

---

Figure 3:
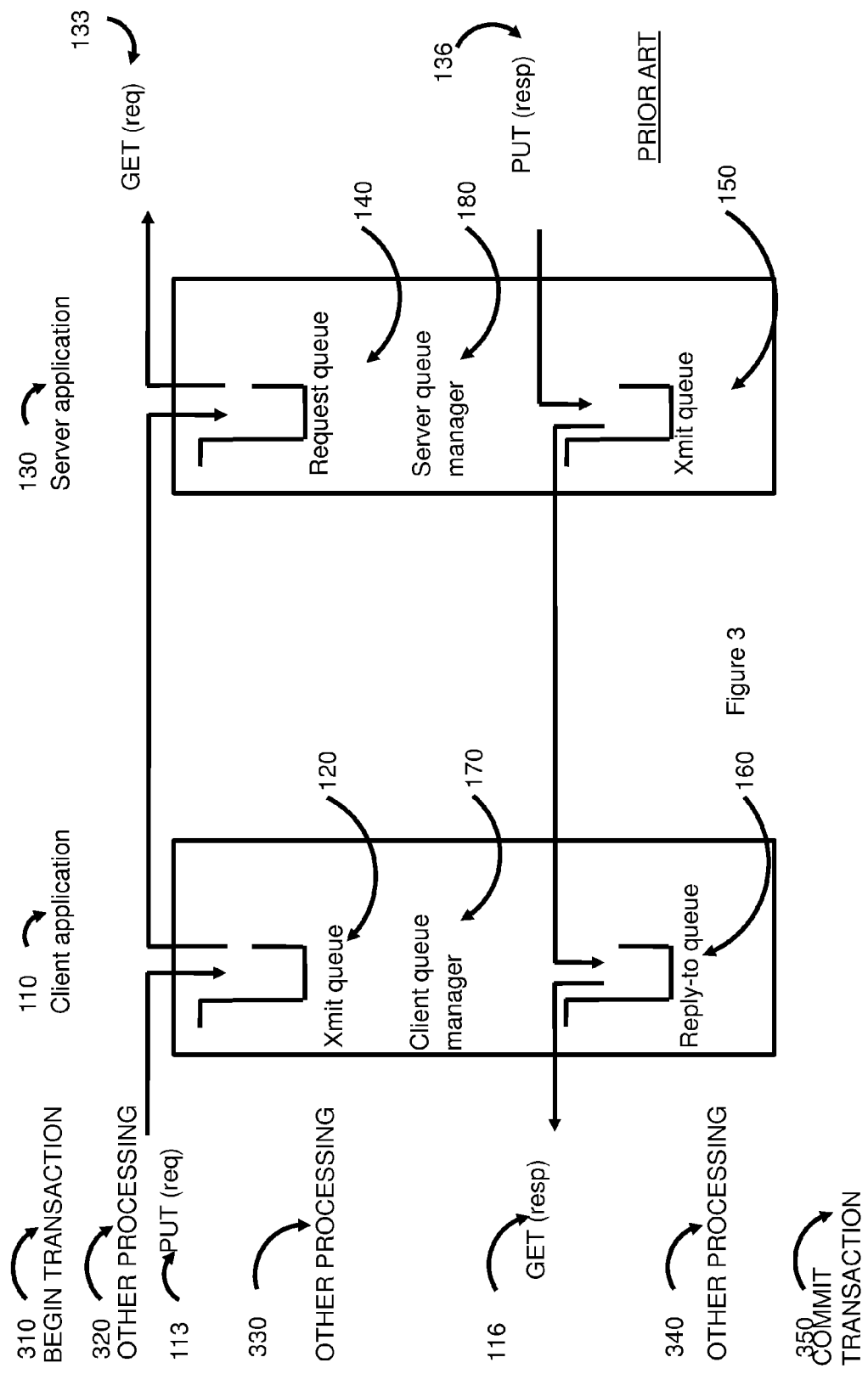
FIG. 3 shows an art example of a transaction problem.

Although the client application 110 wishes to invoke server application 130 by sending a request message and receiving the response message and wants to treat the function provided by server application 130 as part of a single transaction that includes other actions requested by client application 110, the example of FIG. 3 does not work.

The client queue manager 170 does not send the request message from the xmit queue 120 to the request queue 140 until the client application 110 commits the transaction at block 350. The GET verb 116 issued by the client application must fail because there cannot be a response message on the reply-to queue 160. There cannot be a response message on the reply-to queue 160 because the server application 130 has not yet received the request message from the client queue manager 170. As explained above, the server application 130 will not receive the request message because the client queue manager 170 does not send the request until the client application commits the transaction at block 350.

The client application is unlikely to commit the transaction. When the GET verb 116 times out because no reply message has been received, the client application 110 determines that there has been no response to the request message.

The client application 110 correctly deduces that the request was not actioned. The client application 110 backs out the transaction. Backing out the transaction includes backing out the issuing of the PUT verb 113 to send the request message. So, the request message never gets sent at all.

In some embodiments disclosed herein, a communication manager only respond to the client application that the sending a request was successful if the server application has received the request and the communication manager has received its response message. This means that the client application is not left in a state of uncertainty regarding the outcome of the request. Once the communication manager responds to the client application that the sending a request was successful, the client application can assume that the outcome of the request will be available without an unpredictable delay for the response. This overcomes the problems described above with reference to the first and second examples.

In some embodiments disclosed herein, the communication manager includes a client application's queue manager.

In some embodiments disclosed herein, the server application is provided with a predetermined amount of time in which to process the client application's request and transmit its response message to the client application's queue manager.

In still another embodiment, the functionality of the client application sending a request via a communication manager is completed inside a transaction. The functionality of the client application requesting a final response from the communication manager is completed inside this transaction. The client application completes other processing between one or more of the transaction beginning and the asynchronous communication manager responding to the client application that the sending a request was successful. The asynchronous communication manager responds to the client application that the sending a request was successful and the client application requesting a final response from the communication manager. The client application requests a final response from the communication manager and the transaction being committed.

Such techniques allow the simple and intuitive asynchronous messaging model to be employed, but still to have the request, together with other processing included in a transaction.

In some embodiments, the client application sends said request message to a queue name which represents the server application; and the communication manager uses configuration information for said queue name to locate and communicate with the server application.

Figure 4:
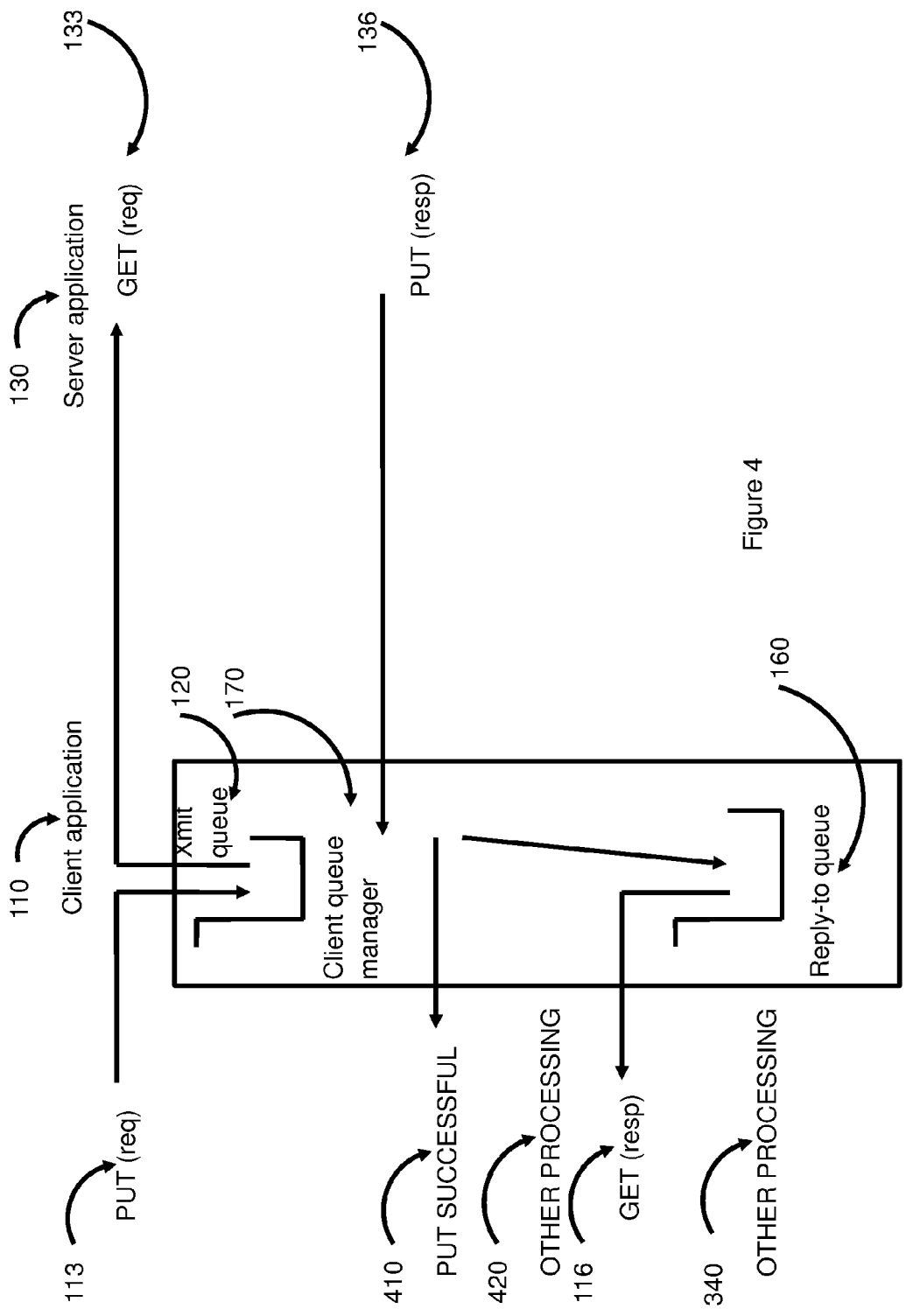
FIG. 4 shows a first "non-transactional" embodiment in a client application and a server application.
Figure 5:
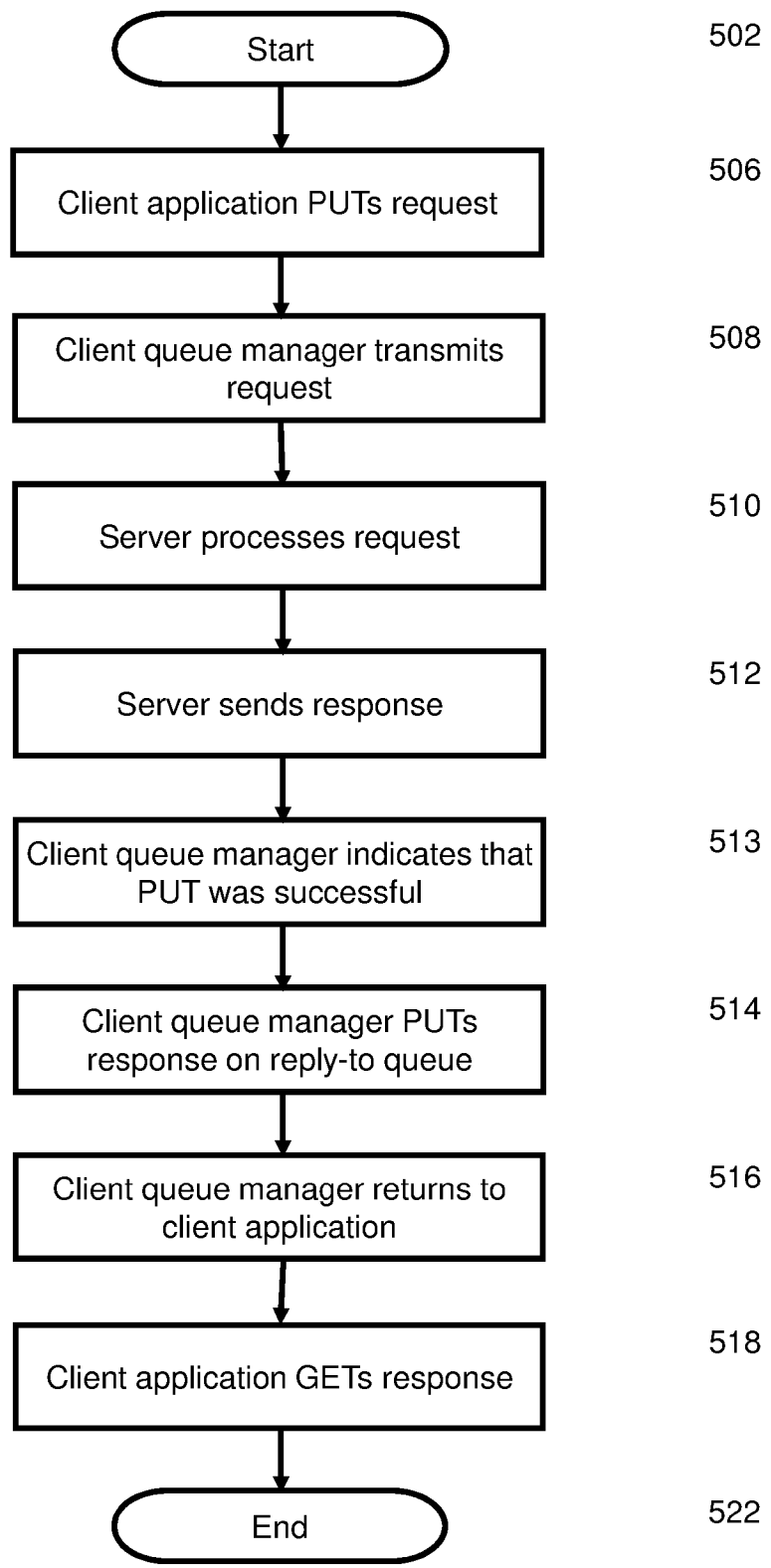
FIG. 5 shows a flow chart of a method according to a "non-transactional" embodiment disclosed herein.

Referring to FIGS. 4 and 5, the request-response interaction in a first embodiment includes the following functionality.

The client application starts at block 502. Blocks 502 to 522 can be found in FIG. 5, other reference numerals are found in FIG. 4. The client application 110 prepares a message (the request) and issues 506 a PUT verb 113 (MQPUT, JMS send, or the like) to send the request message to the server application 130. If an MQPUT is used, then a send-to queue is specified and if a JMS send is used, then a send-to destination is specified. Other implementations may use something equivalent to a send-to queue or a send-to destination. The client application issues the PUT verb 113 outside of syncpoint, which is equivalent to autocommit in database terminology; the PUT verb 113 is executed in its own transaction that is implicitly committed and cannot be rolled back.

In a variation of this first embodiment the client queue manager 170 sends the request message to a queue name which represents the server application 130. This queue name will appear to the client queue manager 170 as if it were a request queue 140 such as that shown in FIGS. 1 to 3. The queue name actually identifies configuration information that specifies how the client queue manager 170 should communicate with the server application 130. This configuration information may include a queue name for use by the client application 110 and a queue location for use by the client queue manager 170, together with other attributes associated with the queue name. In this variation of the first embodiment, those attributes may include a protocol or protocols to use and a network address.

The messaging software (client queue manager 170) sends 508 the request message to the server application 130.

Server application 130 processes 510 the request message (that is performs the requested service) and sends 512 a response message back to the client queue manager 170.

The client queue manager 170 receives the response message, indicates 410, 513 that the PUT operation of the request was successfully completed. The client queue manager 170 also PUTs 514 the response message on the client reply-to queue 160. The client application 110 can, optionally, perform other processing 420. The client queue manager 170 does not indicate that the PUT operation 113 of the request message was successfully completed until after the client queue manager 170 has received the response message from the server application 130 indicating that the request has been completed. The client queue manager 170 returns control 516 to the client application 110.

At some time convenient to the client application 110, it issues 518 a GET verb 116 (MQGET, JMS receive, or the like) to receive the response message. The client application issues the GET verb 116 outside of syncpoint; the GET will be executed in its own transaction that is explicitly committed and cannot be rolled back. Because the response message is already on the reply-to queue 160 the client queue manager 170 delivers the response message immediately. The client application 110 can, optionally, perform other processing 340 after receiving 116, 514 the response message. The client application processing stops at block 522.

If the client queue manager 170 does not receive any response message from the server application 130, then the client queue manager 170 responds 410, 512 to the client application 110 that the PUT operation 113 was not successful. The client application 110 does not attempt to GET the response message. The client application 110 can, optionally, perform other processing 340. The client application processing stops at block 522.

The blocks described above mean that the client application 110 uses the simple, intuitive, and familiar services of asynchronous messaging.

As can be seen from the embodiments described above, this relieves the client application 110 of responsibility for dealing with an unresponsive or excessively slow server application 130. Such problems are detected by the messaging software (for example, by using RPC-style time-outs) which informs the client application 110 by means of an error in the PUT operation 113 (MQPUT, send, or the like). The client application 110 can deal with such errors in the same way as it deals with send-time errors in true asynchronous messaging. Response messages that do arrive, including error response messages, are also handled by the client application 110 in the same way as with true asynchronous messaging.

If an existing or new server application 130 supports RPC invocation then, in embodiments disclosed herein, its services become available, at no extra cost, to client applications that prefer, for whatever reason, to use the asynchronous messaging method of invocation. Client applications 110 can use existing messaging Application Programming Interfaces (MQI, JMS, and the like) to invoke existing or new RPC server applications with no changes or additions required to those server applications 130.

In a preferred embodiment, transactional RPC server applications can be invoked using the call pattern described in the third example in the "Background" section.

In this example, the client application 110 only interacts directly with the client queue manager 170 of the messaging software. The client application 110 uses a single-phase commit (1PC) protocol with the client queue manager 170. The messaging software itself uses transactional RPC protocols to interact with the server application 130. In order to present ACID 1PC transaction semantics to its client application 110, the messaging software uses two-phase commit (2PC) protocols internally.

In this example, the client application 110 uses one-phase commit (1PC) with a single resource manager (RM) which is the client queue manager 170. The client queue manager receives an explicit or implicit start transaction request from the client application; for example, the WebSphere MQ application programming interface includes both (i) an explicit start transaction (MQBEGIN) and (ii) an implicit start transaction in the first in-syncpoint MQPUT, MQGET, or similar. At this time, the messaging software starts its own "inner" two-phase commit (2PC) transaction (possibly by invoking an external transaction manager (TM)). The messaging software performs subsequent recoverable actions on behalf of the client application 110, including interaction with the transactional server application 130, as part of this "inner" 2PC transaction. When the messaging software receives an explicit or implicit commit or roll-back it commits or rolls back the "inner" transaction.

In a second embodiment, the client application 110 uses 2PC. In this embodiment, the client application 110 may also interact with another resource manager. For example, the client application 110 may use the client queue manager 170 to interact with the server application 170 and may also interact with a DB2 database server for SQL requests (DB2 is a trademark of International Business Machines Corporation, registered in many jurisdictions worldwide). In this example, the client application 110 needs to use 2PC. However, from the viewpoint of the client queue manager 170 this embodiment is simpler than the prior art embodiment since the client application 110, the client queue manager 170 and the transactional server application 130 enroll in the 2PC transaction in the usual way.

Figure 6:
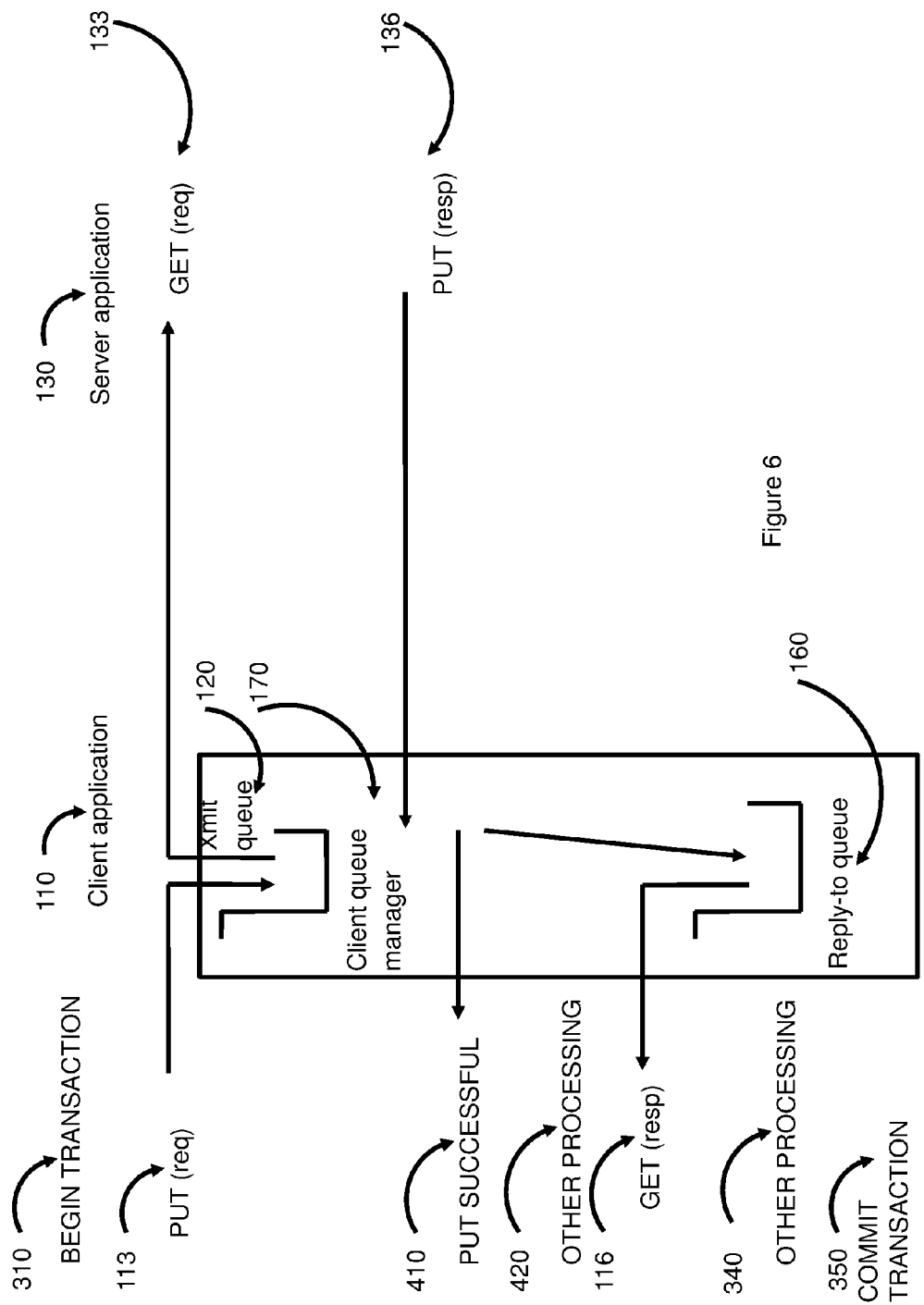
FIG. 6 shows a "transactional" embodiment in a client application and a server application disclosed herein.
Figure 7:
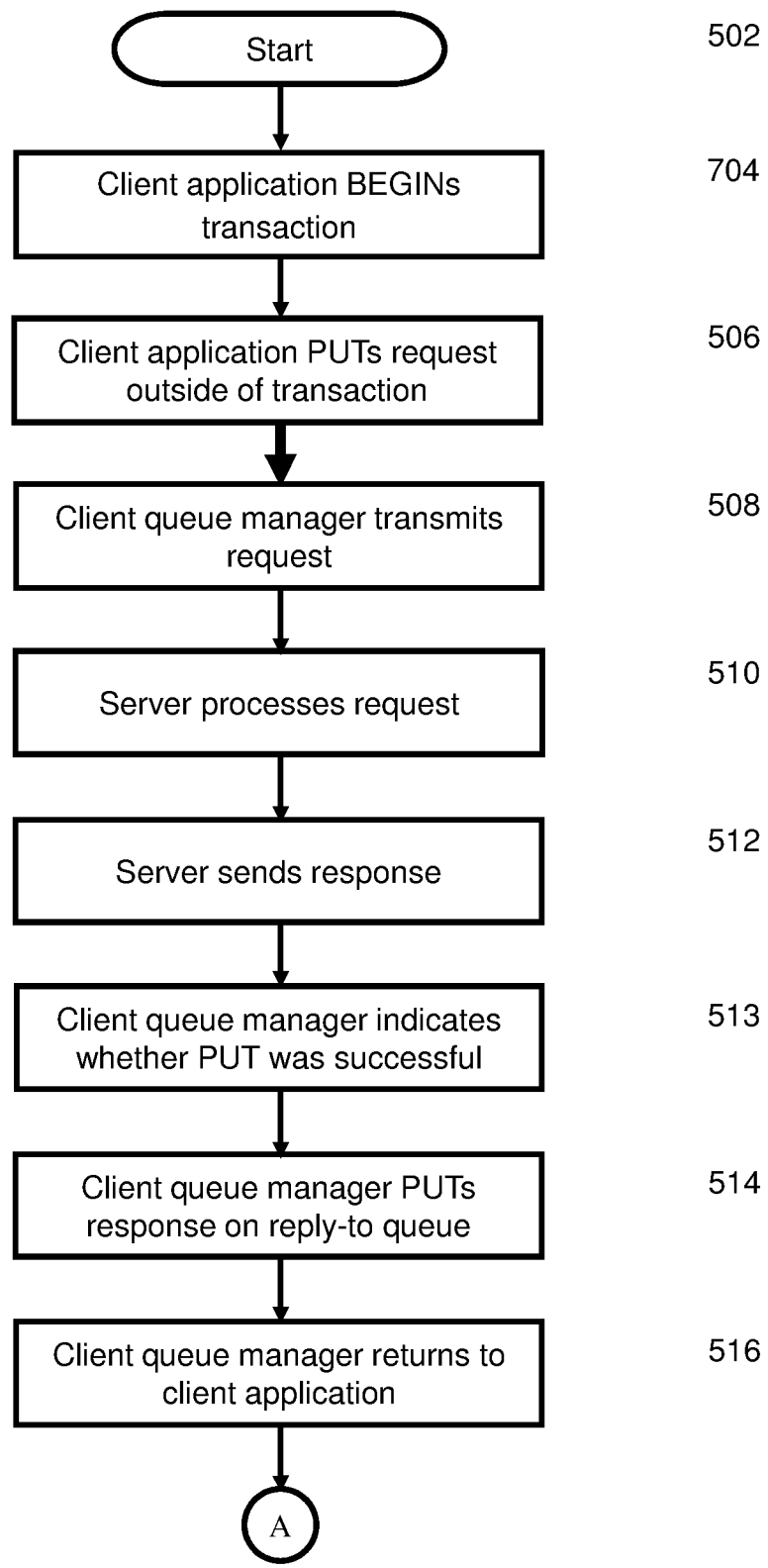
FIGS. 7 and 8 show a flow chart of a method according to the "transactional" embodiment.
Figure 8:
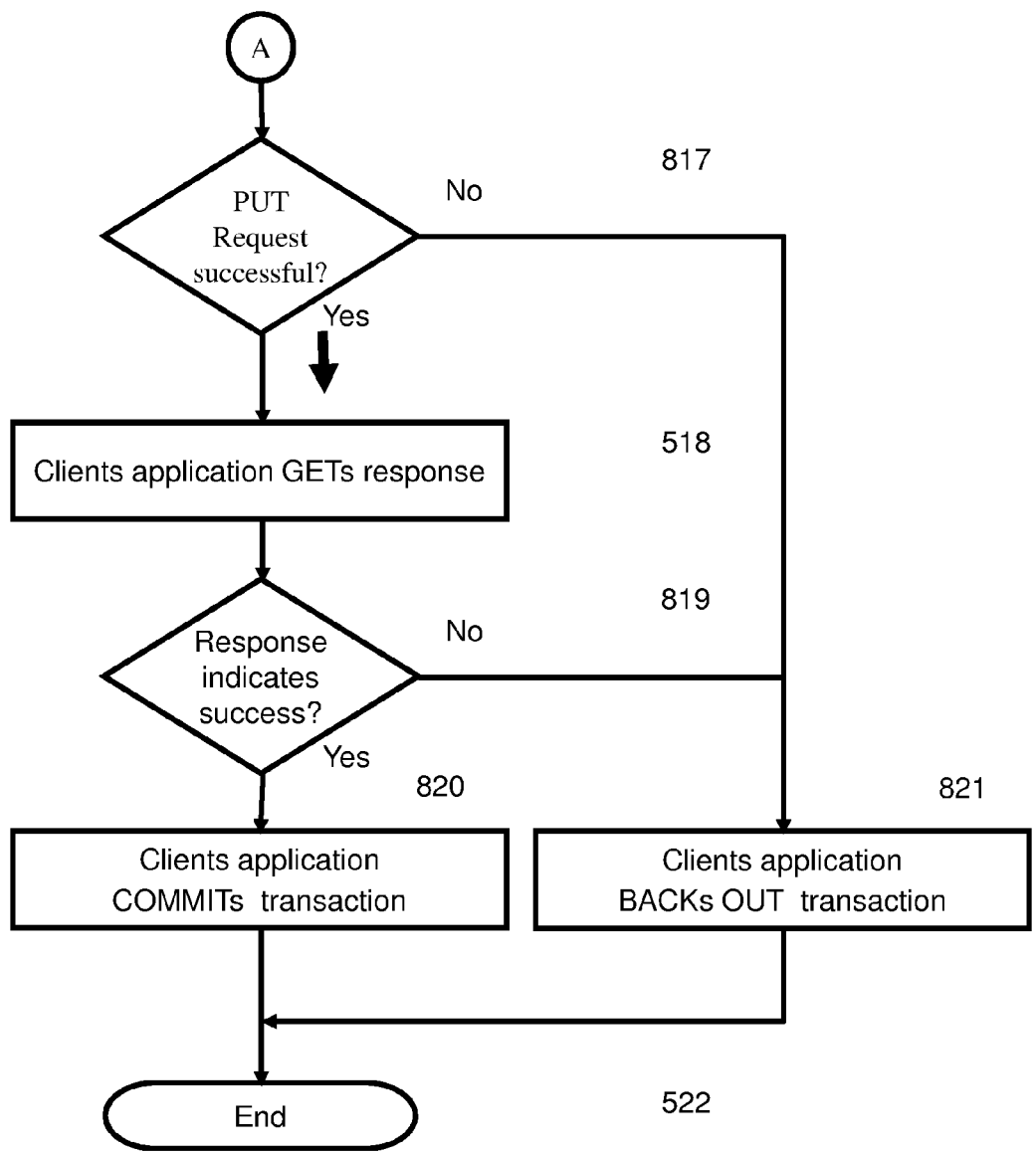

Referring to FIGS. 6, 7 and 8, the client application 110 starts at block 502 and may now BEGIN 310, 704 a transaction that will include optional blocks of other processing 420, 340 as well as the PUT operation 113 and the GET operation 116. The client application 110 issues 506 a PUT verb as described above with reference to FIG. 5. The PUT verb 113 is issued by the client queue manager 170 to deliver the request message without waiting for an explicit COMMIT action in the client application 110. This means that the problem highlighted in the third example above is avoided. This allows the use of the simple and intuitive asynchronous model whilst allowing the operations to be incorporated into a transaction.

The messaging software (client queue manager 170) sends 508 the request message to the server application 130.

Server application 130 processes 510 the request message (that is performs the requested service) and sends 512 a response message back to the client queue manager 170.

Again, as described above with reference to FIGS. 4 and 5, the client queue manager 170 indicates 410, 513 that the PUT operation of the request was successfully completed. The client application 110 can, optionally, perform other processing 420. The client queue manager 170 also PUTs 514 the response message on the client reply-to queue 160. The client queue manager 170 does not indicate that the PUT operation 113 of the request message was successfully completed until after the client queue manager 170 has received the response message from the server application 130 indicating that the request has been completed. The client queue manager 170 returns control 516 to the client application 110. The client application 110 can, optionally, perform other processing 420.

If, at block 817, the PUT request was not successful, then the client application 110 may BACKOUT 821 the transaction, the transaction including the optional blocks of other processing 420, 340. The BACKOUT request is propagated to the server application either by the client queue manager 170 or, if there is one, by the external transaction manager, the server application (and in the 2PC case, all the other resource managers), roll back the transaction and the client application's 110 BACKOUT completes. In all cases, the client application processing stops at block 522.

If, at block 817, the PUT request was successful, then at some time convenient to the client application 110, it issues 518 a GET verb 116 (MQGET, JMS receive, or the like) to receive the response message.

At block 819, if the response indicates that the request was completed successfully, then the client application may now COMMIT 350, 820 the transaction, the transaction including the processing performed by the server application 130, the optional blocks of other processing 420, 340 and the GET operation 116, 518. The COMMIT request is propagated to the server application 130 either by the client queue manager 110 or, if there is one, by an external transaction manager. In accordance with established transactional behavior, the server application (or in the 2PC case, any of the other resource managers) can report that it is unable to COMMIT. In this case, the server application (and in the 2PC case, all the other resource managers) roll back the transaction and the client application's COMMIT completes with an error return. Unlike conventional roll back for asynchronous messaging, in the described embodiments, the roll back does not restore the response message to the reply-to queue. This avoids the undesired effect of the response message continuing to exist after the request is rolled back. In all cases the client application processing stops at block 522.

At block 819, if the response indicates that the request was not completed successfully, then the client application 110 may BACKOUT 821 the transaction, the transaction including the optional blocks of other processing 420, 340. The BACKOUT request is propagated to the server application either by the client queue manager 170 or, if there is one, by the external transaction manager, the server application (and in the 2PC case, all the other resource managers), roll back the transaction and the client application's 110 BACKOUT completes. Unlike conventional roll back for asynchronous messaging, in the described embodiments, the roll back does not restore the response message to the reply-to queue. This avoids the undesired effect of the response message continuing to exist after the request is rolled back. In all cases, the client application processing stops at block 522.

Embodiments disclosed herein can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-RW), and DVD.

What is claimed is:

1. A method for facilitating communication between a client application and a server application, the method comprising:
   receiving a request from the client application, the receiving at a communication manager executing on a processor, to initiate communication with the server application, wherein the client application is an asynchronous application and the server application is a synchronous application;
   the communication manager sending said request synchronously to the server application;
   responsive to the communication manager not having received a final response from the server application, the communication manager responding to the client application that said sending the request was unsuccessful;
   responsive to the communication manager having received a final response from the server application, the communication manager retaining the final response from the server application and responding to the client application that the sending a request was successful;
   receiving, from the client application and at the communication manager, a request for the final response; and
   the communication manager providing the previously retained final response from the server application to the client application, the providing in response to the request for the final response and to the communication manager having received the final response.

2. The method of claim 1, wherein the communication manager comprises a client application's queue manager.

3. The method of claim 2, further comprising:
   providing the server application with a predetermined amount of time in which to process the client application's request and transmit the final response to the client application's queue manager.

4. The method of claim 1, wherein:
   the request from the client application via the communication manager is completed inside a transaction;
   the client application requesting a final response from the communication manager is completed inside said transaction; and
   the client application completes other processing between one or more of the transaction beginning and the communication manager responding to the client application that the sending a request was successful, the communication manager responding to the client application that the sending a request was successful and the client application requesting a final response from the communication manager, and the client application requesting a final response from the communication manager and the transaction being committed.

5. The method of claim 1, wherein:
   said client application sends said request to a queue name which represents the server application; and
   said communication manager uses configuration information for said queue name to locate and communicate with the server application.

6. An apparatus for facilitating communication between a client application and a server application, the apparatus comprising a memory having computer readable instruction and a processor for executing the computer readable instructions to implement:
   a communication manager,
   wherein the client application is configured to initiate communication with the server application by sending a request via the communication manager, and the communication manager is configured to send said request synchronously to the server application, wherein the client application is an asynchronous application and the server application is a synchronous application;
   wherein the communication manager is configured to respond to the client application by indicating that said sending the request was unsuccessful, responsive to the communication manager not having received a final response from the server application,
   wherein the communication manager is further configured to retain a final response from the server application and to respond to the client application that the sending a request was successful, responsive to the communication manager having received the final response from the server application; and
   wherein, based on the communication manager having received the final response and to a request from the client application for the final response from the communication manager, the communication manager is further configured to provide the previously retained final response from the server application to the client application.

7. The apparatus of claim 6, wherein the communication manager comprises a client application's queue manager.

8. The apparatus of claim 7, wherein the communication manager is further configured to provide the server application with a predetermined amount of time in which to process the client application's request and transmit the final response to the client application's queue manager.

9. The apparatus of claim 6, wherein:
   the request from the client application via the communication manager is completed inside a transaction,
   the client application request for a final response from the communication manager is completed inside said transaction,
   the client application is further configured to complete other processing between one or more of the transaction beginning,
   the communication manager is configured to respond to the client application that the sending a request was successful, and
   the client application is further configured to request a final response from the communication manager upon the transaction being committed.

10. The apparatus of claim 6, wherein:
    said client application is configured to send said request to a queue name which represents the server application; and
    said communication manager is further configured to use configuration information for said queue name to locate and communicate with the server application.

11. A computer program product for facilitating communication between a client application and a server application, the computer program product comprising:

a non-transitory computer readable storage medium having computer readable program code embodied therewith, the computer readable program code executable by a processor for:

receiving, from the client application and via a communication manager, a request for initiating communication with the server application, wherein the client application is an asynchronous application and the server application is a synchronous application;

sending, by the communication manager, said request synchronously to the server application;

responsive to the communication manager not having received a final response from the server application, the communication manager responding to the client application that said sending the request was unsuccessful;

responsive to the communication manager having received a final response from the server application, the communication manager retaining the final response from the server application and responding to the client application that the sending a request was successful;

receiving, from the client application and at the communication manager, a request for the final response; and the communication manager providing the previously retained final response from the server application to the client application, the providing in response to the request for the final response and to the communication manager having received the final response.

12. The computer program product of claim 11, wherein the communication manager comprises a client application's queue manager.

13. The computer program product of claim 12, further comprising:

providing the server application with a predetermined amount of time in which to process the client application's request and transmit the final response to the client application's queue manager.

14. The computer program product of claim 11, wherein:

the request from the client application via the communication manager is completed inside a transaction;

the client application requesting a final response from the communication manager is completed inside said transaction; and the client application completes other processing between one or more of the transaction beginning and the communication manager responding to the client application that the sending a request was successful, the communication manager responding to the client application that the sending a request was successful and the client application requesting a final response from the communication manager, and the client application requesting a final response from the communication manager and the transaction being committed.

15. The computer program product of claim 11, wherein:

said client application sends said request to a queue name which represents the server application; and said communication manager uses configuration information for said queue name to locate and communicate with the server application.

\* \* \* \* \*